US012240644B2

(12) United States Patent
Marseglia et al.

(10) Patent No.: US 12,240,644 B2
(45) Date of Patent: Mar. 4, 2025

(54) BUD SORTING AND PACKAGING APPARATUS, SYSTEMS AND METHODS

(71) Applicant: InTunes Products, LLC, Webster, NY (US)

(72) Inventors: Michael Marseglia, Webster, NY (US); Steven T. Gizzi, Webster, NY (US); Scott Baube, Webster, NY (US); Jeffrey S. Clough, Webster, NY (US)

(73) Assignee: InTunes Products, LLC, Webster, NY (US)

( * ) Notice: Subject to any disclaimer, the term of this patent is extended or adjusted under 35 U.S.C. 154(b) by 110 days.

(21) Appl. No.: 17/975,182

(22) Filed: Oct. 27, 2022

(65) Prior Publication Data
US 2023/0415943 A1 Dec. 28, 2023

Related U.S. Application Data

(60) Provisional application No. 63/355,395, filed on Jun. 24, 2022.

(51) Int. Cl.
B25J 9/16 (2006.01)
B07C 5/28 (2006.01)
(Continued)

(52) U.S. Cl.
CPC ............ B65B 57/14 (2013.01); B07C 5/28 (2013.01); B25J 9/0093 (2013.01); B25J 9/1687 (2013.01);
(Continued)

(58) Field of Classification Search
CPC ...... B25J 9/1687; B25J 9/1697; B25J 9/0093; B25J 9/0084; B25J 13/08; B65B 57/14; B65B 5/08; B65B 5/105
See application file for complete search history.

(56) References Cited

U.S. PATENT DOCUMENTS 4,557,019 A * 12/1985 Van Devanter .......... B26D 7/30
83/365
4,655,676 A * 4/1987 Jannborg ............... B25J 9/0018
414/730
(Continued)

FOREIGN PATENT DOCUMENTS

CN 114116463 3/2022
KR 1020210078170 6/2021
WO 2018059977 4/2018

Primary Examiner — Andrew M Tecco
(74) Attorney, Agent, or Firm — Woods Oviatt Gilman LLP; Katherine H. McGuire, Esq.

(57) ABSTRACT

A cannabis bud sorting, picking and filling system includes a computer vision system operable to view and estimate the weight of a plurality of buds on a bud picking tray and to direct a bud picker robot to pick a plurality of buds from the bud picking tray and deposit the picked buds in an amount to load a container to its predetermined loaded target weight. A computer vision system acquires a digital image of product items having a product type, identifying each product item in the image, determining a pixel-based area for each identified product item, predicting a weight of each identified product item based on a size thereof, the determined pixel-based area and a predetermined density based on the product type, grouping, based on the predicted weights, the identified product items into groups satisfying the target weight, and automatedly picking and placing each group into a container.

23 Claims, 14 Drawing Sheets

(51) Int. Cl.
  *B25J 9/00* (2006.01)
  *B25J 13/08* (2006.01)
  *B65B 5/06* (2006.01)
  *B65B 5/08* (2006.01)
  *B65B 35/16* (2006.01)
  *B65B 57/14* (2006.01)
  *B65B 57/18* (2006.01)
  *G06V 10/764* (2022.01)
  *G06V 10/778* (2022.01)
  *G06V 10/88* (2022.01)

(52) U.S. Cl.
  CPC ............ *B25J 9/1697* (2013.01); *B25J 13/08* (2013.01); *B65B 5/06* (2013.01); *B65B 5/08* (2013.01); *B65B 35/16* (2013.01); *B65B 57/18* (2013.01); *G06V 10/764* (2022.01); *G06V 10/778* (2022.01); *G06V 10/88* (2022.01)

(56) References Cited

U.S. PATENT DOCUMENTS

| | | | | |
|---|---|---|---|---|
| 9,492,923 | B2 * | 11/2016 | Wellman | B25J 9/1612 |
| 10,360,531 | B1 * | 7/2019 | Stallman | G06Q 10/087 |
| 11,491,656 | B2 * | 11/2022 | Edwards | B65B 69/0033 |
| 11,731,792 | B2 * | 8/2023 | Menon | B65B 5/12 53/445 |
| 2013/0110280 | A1 * | 5/2013 | Folk | B25J 9/0093 700/215 |
| 2019/0061151 | A1 * | 2/2019 | Namiki | B65G 57/00 |
| 2020/0094997 | A1 * | 3/2020 | Menon | B65B 35/54 |
| 2020/0306973 | A1 * | 10/2020 | Edwards | B25J 9/1694 |
| 2022/0108524 | A1 | 4/2022 | Wan et al. | |

* cited by examiner

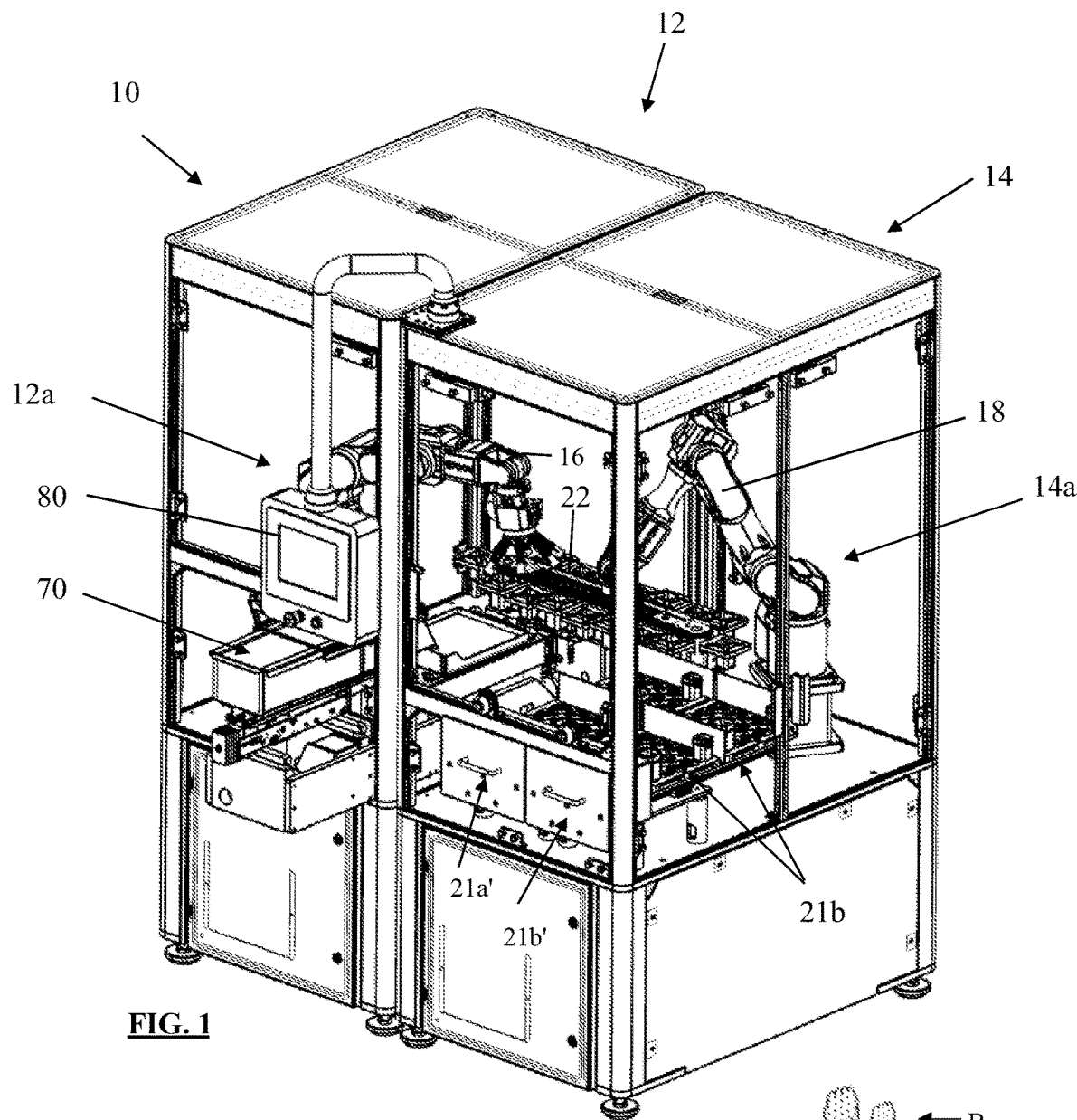
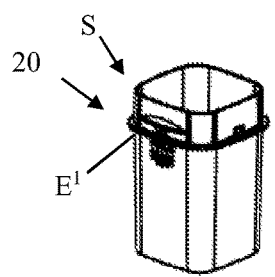
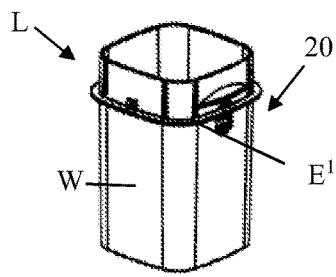
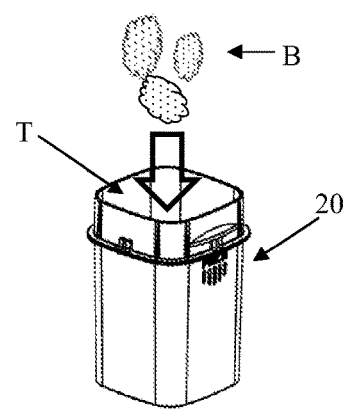
FIG. 1
FIG. 2A
FIG. 2B
FIG. 2C

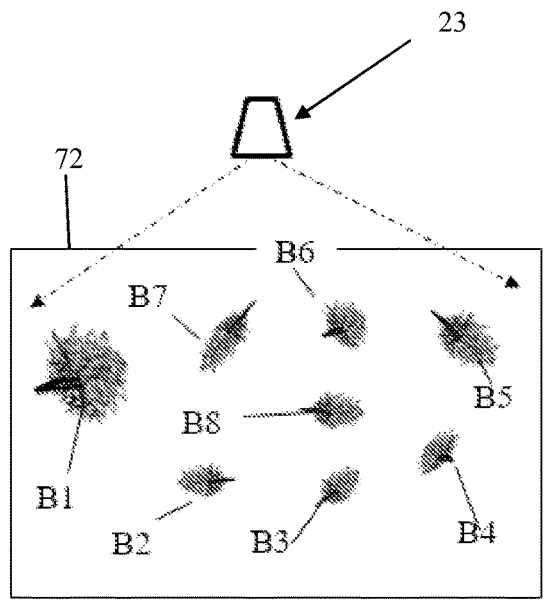
FIG. 11
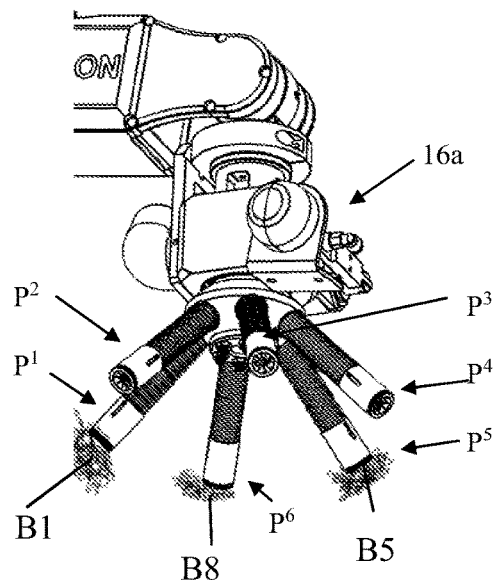
FIG. 12
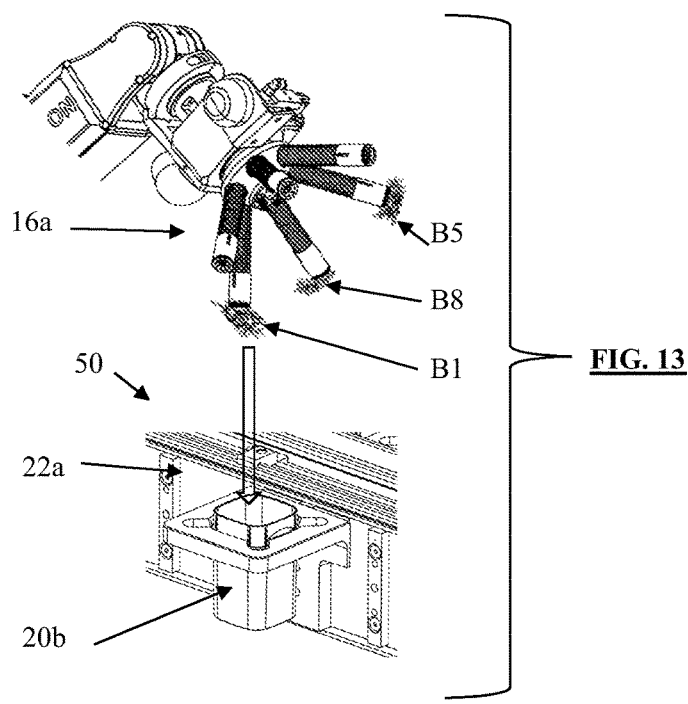
FIG. 13
Vision System
23/Bud Weight
Estimator
Software/Database
FIG. 14A

BUD SORTING AND PACKAGING APPARATUS, SYSTEMS AND METHODS

PRIORITY CLAIM

The present application claims the benefit of U.S. Provisional Application No. 63/355,395, entitled "Bud Sorting and Packaging Apparatus, Systems and Methods," filed on Jun. 24, 2022, the entirety of which is hereby incorporated by reference.

TECHNICAL FIELD OF THE INVENTION

The present invention relates packaging apparatus, systems and methods, and more particularly relates to automated packaging of cannabis buds into containers having a target loaded weight. While the invention is described with reference to the packaging of cannabis buds, the invention is applicable to the packaging of other product types.

BACKGROUND OF THE INVENTION

Cannabis buds consisting leaf matter attached to a stem are typically sold in a variety of container forms, such as vials, bags and tubes, for example. These containers need to be loaded with a specific weight of product. In the typical case of glass or plastic vials (also referred to herein as "drams"), commonly offered specific loaded dram weights are 3.5 gram and 7 gram weights. Current practice is to manually pick and load each dram with cannabis buds until the target weight is reached. The manual process has many drawbacks such as being time and labor intensive which adds to the manufacturing costs. It would also be preferable not to require manual handling of the cannabis buds since the buds are delicate and can be easily damaged. If the buds are handled too roughly, individual leaves are dislodged from the bud stem making the bud less desirable to package as a high leaf to stem matter ratio is preferred. Furthermore, dislodged bud leaves are typically directed to a waste bin resulting in loss of product and profit.

There is therefore a need for an automated solution to bud packaging which reduces or eliminates direct operator manual contact with the buds while maintaining smooth machine handling thereof so as to reduce product waste and further lower costs by increasing the speed and accuracy of the bud packaging operation.

SUMMARY OF THE INVENTION

The present invention addresses the above needs by providing apparatus, systems and methods for packaging cannabis buds into containers/drams by target weight.

One embodiment includes an optional empty dram transporter function wherein a dram transport robot with a pick and place EOAT (end of arm tool) picks an empty dram from an empty dram location and places the empty dram either directly at a dram filling station or by placing the empty dram on a conveyor or other dram transport device which delivers the empty dram to the dram filling station.

A dram filling robot with a pick and place arm picks and places one or more individual buds into the empty dram until the predetermined target weight (plus or minus an acceptable tolerance) is reached. The filled dram may then be directed to shipping. In an embodiment, the filled dram is picked by the dram transport robot which places the filled dram in a shipping box, or a larger container or a tray for delivery to a filled dram final packaging and shipping area.

In an embodiment having the empty dram transporter function, the dram transport robot and associated apparatus may be provided in a "dram handling module" with the dram filling robot provided in a separate "dram filling module". The word "module" as used herein refers to any type of structure that allows for the mounting and transport of the respective robot and associated apparatus. Each module may further be configured to allow adjacent placement of two or more modules with cooperative processes (which may be automated, semi-automated and/or manual processes) occurring between adjacent modules.

Thus, in an embodiment, the dram filling module and the dram handling module may be separable whereby alternate configurations are made possible by simply adding to or removing one or more of each of the dram filling module and the dram handling module. Such modularity allows for quick production configuration changes as may be required at any given time as will be discussed more fully below.

In an embodiment, a computer vision system is provided which is operable to view and estimate the weight of individual buds presented for picking by the bud pick and place robot. This may be done via density estimator software discussed further below. Machine learning may be included to keep the machine vision software bud weight estimator database updated.

In an embodiment, the bud pick and place robot has two or more and preferably eight individual bud picking heads arranged on the robot end of arm (the picking heads collectively referred to as the end or arm tool or "EOAT"). Understanding that more than a single bud is typically required to fill a single dram to the target weight, rather than picking and placing single buds one at a time into a dram (i.e., in the order of pick, place, pick, place, pick, place, etc.) the provision of multiple picking heads allows the EOAT to pick a group of buds before moving to the dram for filling (i.e., in the order of pick, pick, pick, . . . pick (up to the number of individual picking heads on the EOA), place).

Other objects and advantages of the present invention will become apparent from the following description taken in connection with the accompanying drawings, wherein is set forth by way of illustration and example, embodiments of this invention.

BRIEF DESCRIPTION OF THE DRAWING

FIG. 1 is a perspective view of an embodiment of the invention;

FIG. 2A is a perspective view of a 3.5 gram dram in accordance with an embodiment of the invention;

FIG. 2B is a perspective view of a 7 gram dram in accordance with an embodiment of the invention;

FIG. 2C is a perspective view of the 7 gram dram with cannabis buds B spaced thereabove;

FIG. 11 is a top plan view of a simplified schematic of the bud pick tray with associated camera vision of the buds on the tray;

FIG. 12 is a fragmented, perspective view of the bud picking robot with individual buds picked and held by respective picker heads;

FIG. 13 is a perspective view of the picking robot spaced above a dram to be filled with buds on the picking heads;

FIG. 14A is a block diagram of an embodiment of the control hardware and software components associated with the dram handling, bud picking and dram filling operations;

DETAILED DESCRIPTION OF PREFERRED EMBODIMENTS

Figure 3:
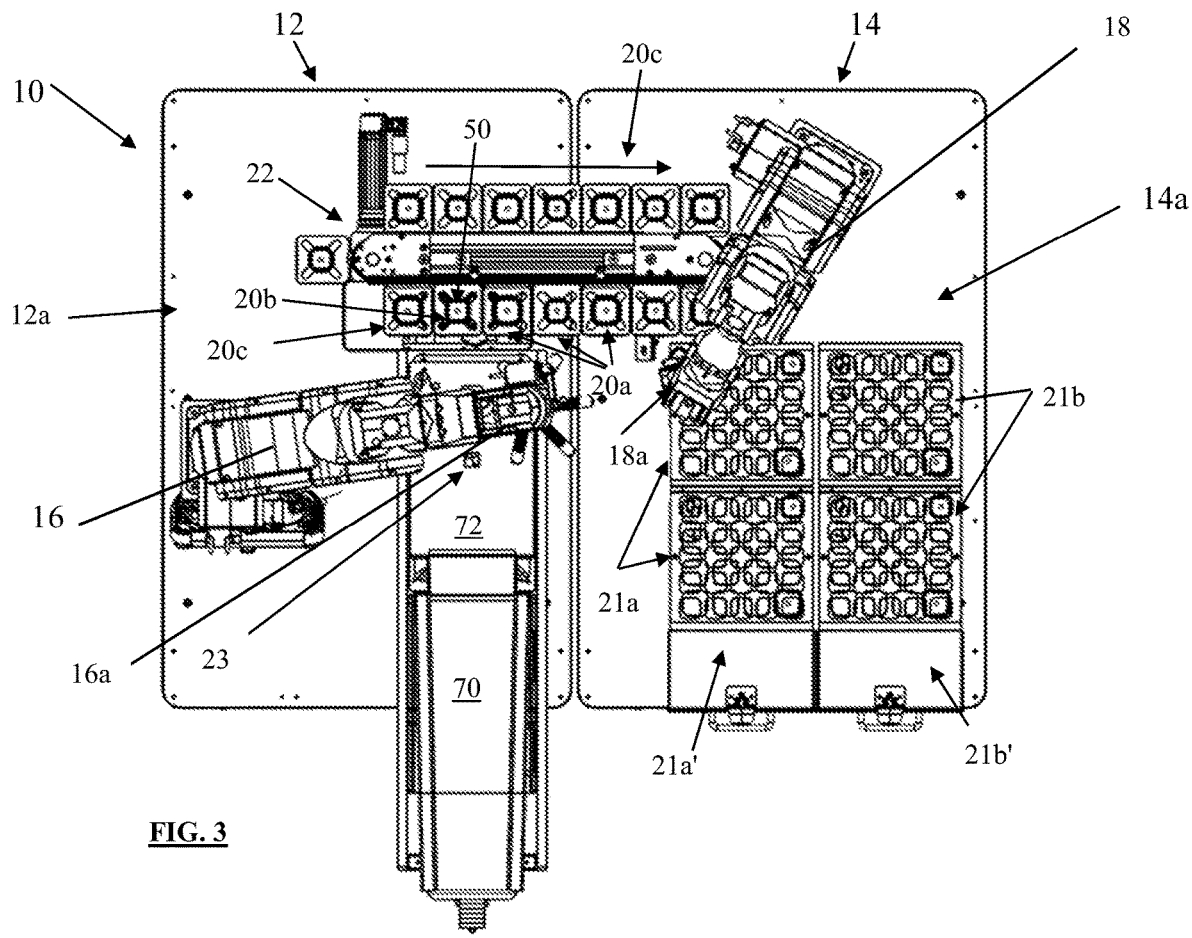
FIG. 3 is a top plan view of the working area of FIG. 1.

Referring now to the Figures, an embodiment of a bud sorting and dram filling system 10 is provided which may be housed in side-by-side cabinets 12 and 14 wherein a product pick and fill system 12a and a dram handling system 14a are provided, respectively. The product pick and fill system 12a includes a dram filling robot 16 having a pick and place end of arm tool 16a ("EOAT 16a"). The dram handling system 14a includes a dram transport robot 18 having a pick and place end of arm tool 18a ("EOAT 18a").

Figure 16:
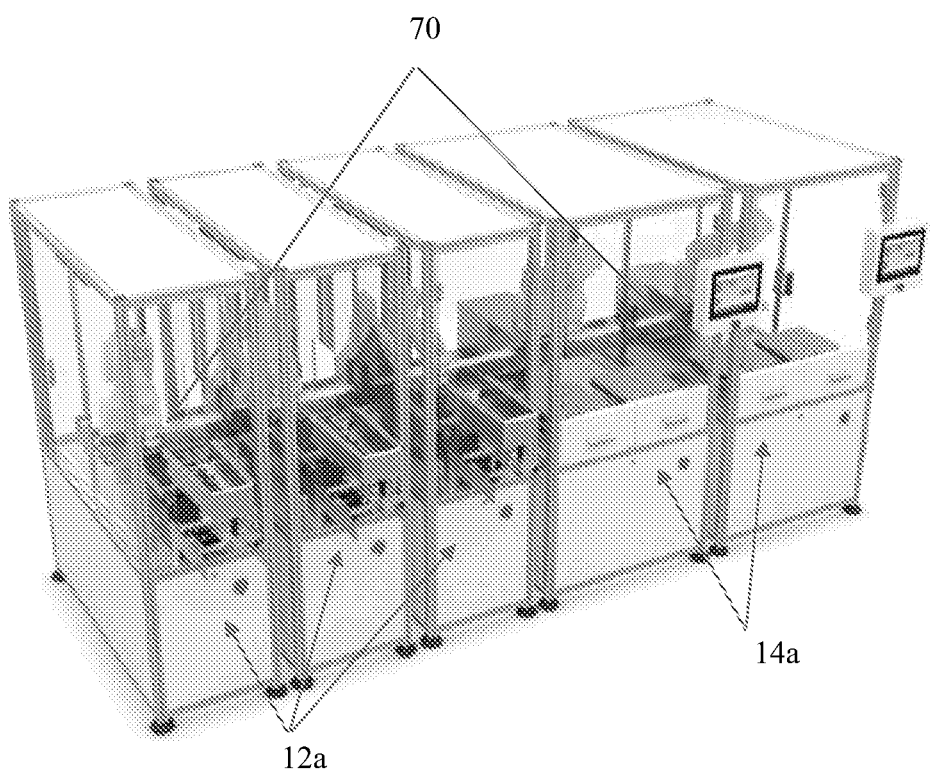
FIG. 16 is a perspective view of two dram handling modules connected to three dram picking modules illustrating the modularity and scaling possibilities of the invention.

As stated above, dram handling system 14a including dram transport robot 18 and associated apparatus may be provided in a movable structure or "dram handling module" which may be in the form of cabinet 14. The dram filling product pick and fill system 12a may be provided in a separate movable structure or "dram filling module" which may be in the form of cabinet 12. The word "module" as used herein refers to any type of structure that allows for the transport of the respective robots and their associated apparatus. Each module may further be configured to allow adjacent placement of two or more modules with cooperative and/or shared (e.g., conveyor 22) processes (which may be automated, semi-automated and/or manual processes) occurring between adjacent modules as seen in the example of FIG. 16.

Thus, in an embodiment, the dram filling module 12a and the dram handling module 14a may be separable whereby alternate configurations are made possible by simply adding to or removing one or more of each of the dram filling module and the dram handling module. Such modularity allows for quick production configuration changes as may be required at any given time as will be discussed more fully below.

FIGS. 2A, 2B and 2C show bud containers of a type typically referred to as "drams" 20 wherein the buds "B" are deposited for packaging, it being understood that other container configurations are possible including, for example, bottles, pouches, vials, blister packs, and the like. Furthermore, while the invention is illustrated and described herein as being used for the packaging of cannabis buds, it will be appreciated that the invention may be used for packaging other types of product.

The containers or drams may be of different sizes. In the illustrated embodiment, two different sized drams are provided, the short dram seen in FIG. 2A is indicated by reference letter "S" and the tall dram seen in FIG. 2B is indicated by the reference letter "T". For example, short dram S may be sized for filling a common available weight of 3.5 grams of buds B while the tall dram T may be sized for filling a larger common available weight of 7 grams of buds B. Of course these dram sizes and respective product weights may vary as needed.

The drams 20 may be provided with one or more features designed to allow the dram transport robot EOAT 18a to pick and place the dram from one location to another. In the illustrated embodiment, a protruding lip or edge "$E^1$" is defined at and encircles the outwardly facing surface of the dram wall "W" thereby providing a surface against which the inwardly turned, opposing fingers $F^1$ and $F^2$ of the EOAT 18a may engage to lift the dram (see also FIG. 7).

Figure 7:
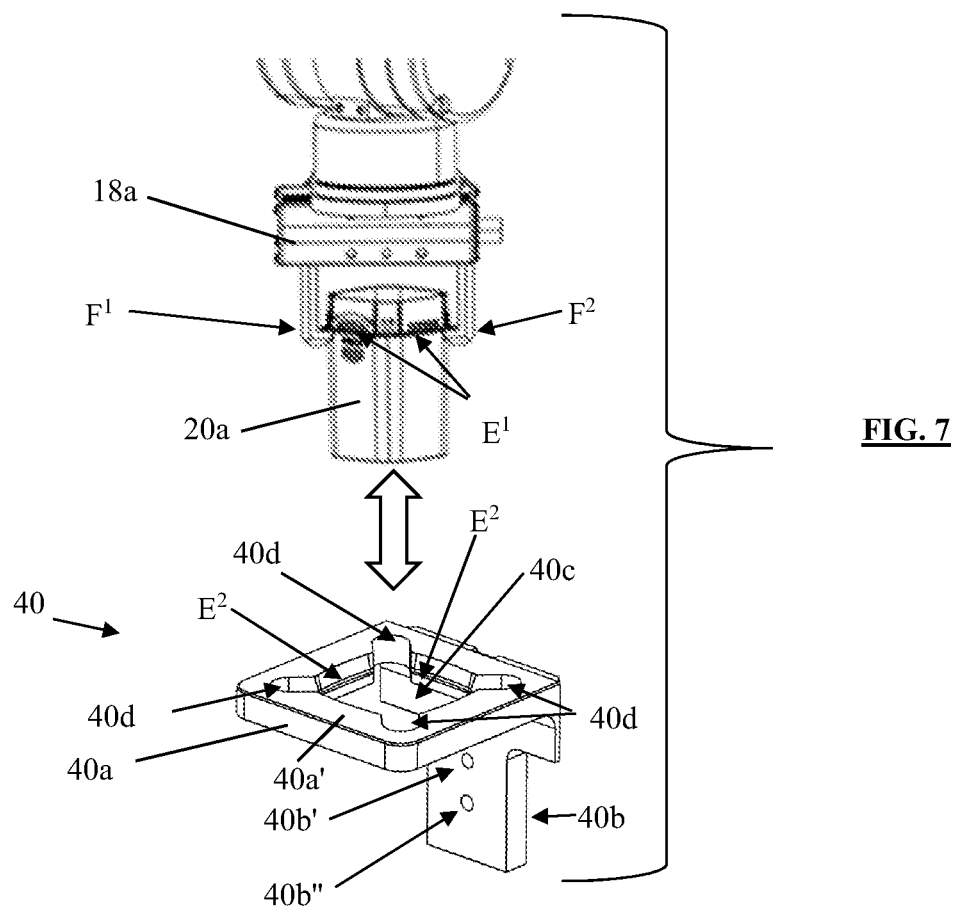
FIG. 7 is a perspective view of a dram picked by the dram handling robot spaced above a dram nest.
Figure 8:
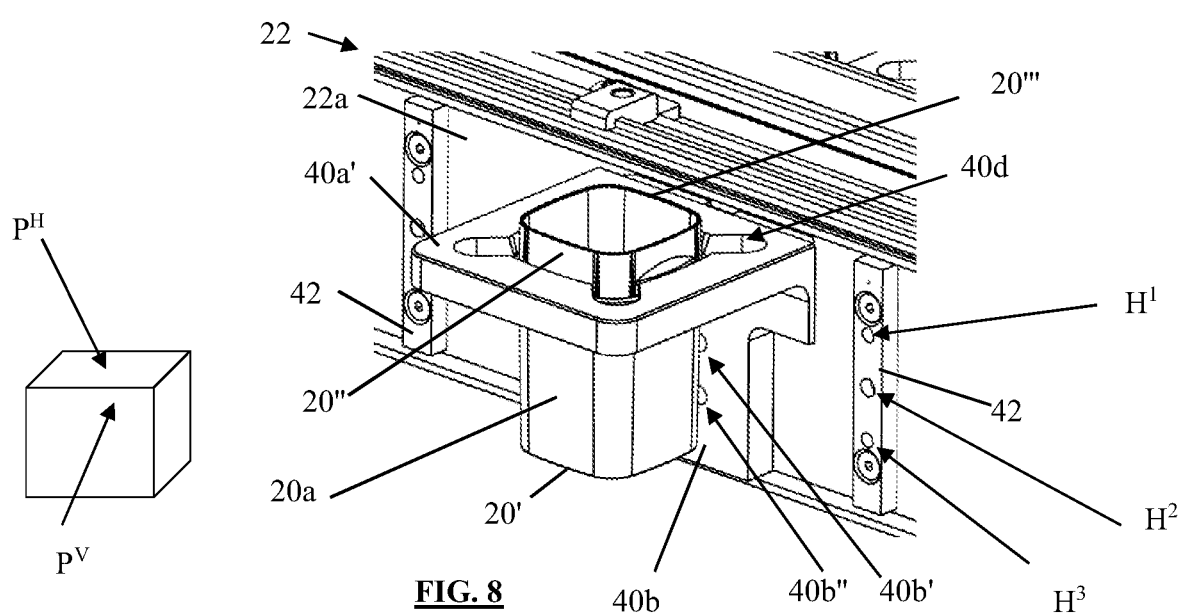
FIG. 8 is a fragmented, perspective view of a dram seated within a dram nest.
Figure 9:
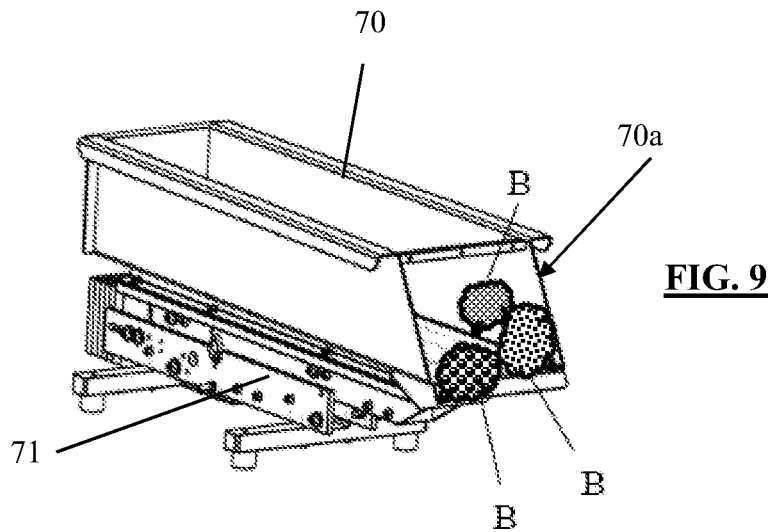
FIG. 9 is a perspective view of a bud hopper, perspective view showing the dram scale station of the conveyor.
Figure 10:
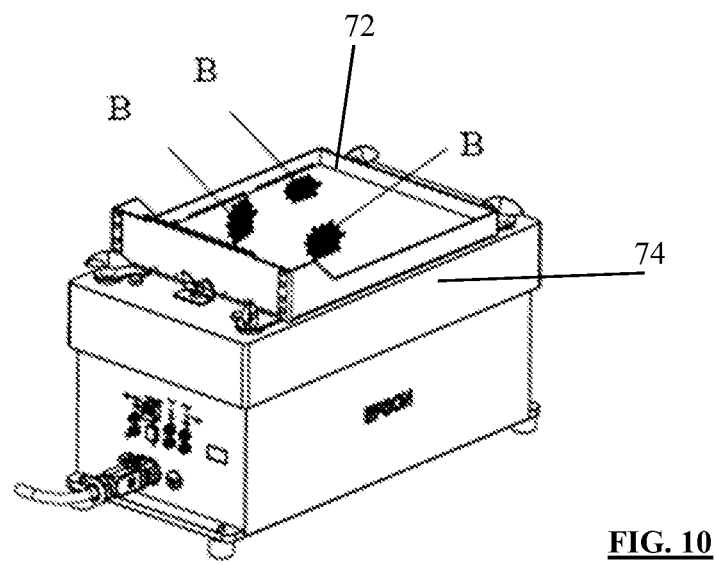
FIG. 10 is a perspective view of a bud pick tray.

Referring still to FIG. 7 and also now to FIG. 8, an exemplary conveyor dram holder 40 is seen, a plurality of which may be secured to dram conveyor 22 in linearly spaced relation along conveyor endless belt 22a, the planar surface of which is oriented along a vertical plane $P^V$. Dram holder 40 may have a dram seat segment 40a and a securing segment 40b.

Any suitable securing elements may be provided to secure the dram holders 40 to the conveyor belt 22a. For example, mounting bars 42 may be secured in vertically oriented and linearly spaced relation along belt 22a to which respective dram holders 40 may be secured by aligning the holes 40b' and 40b" in dram holder securing segment 40b with the holes in a respective mounting bar 42 and passing screws (not shown) or the like therethrough.

It is noted that while dram holder securing segment 40b includes two spaced holes 40b' and 40b", FIG. 8 shows three holes $H^1$-$H^3$ formed in linearly spaced relation along each mounting bar 42. This is to provide the option of using the upper hole $H^1$ and middle hole H 2, in which case the dram holder will be located a vertically higher on the conveyor belt 22a than a dram holder 40 secured to the lower hole $H^3$ and middle hole H 2.

As seen best in FIG. 15, this arrangement causes the bottom 20' of each dram on the conveyor to extend substantially along the same horizontal plane "H". As will be explained in more detail below, a dram weight scale 60 having a dram nest 62 is located at the product filling station 50. When the nest 62 is raised, it engages the bottom 20' of the dram 20b and lifts the dram for weight measurement as described in more detail below.

In the illustrated embodiment, this "high-low" successive dram holder arrangement repeats along belt 22a with the short drams "S" seated in the lower dram holders and the tall drams "T" seated in the higher dram holders to accommodate their difference in height. It is noted that this "high-low" successive dram holder arrangement may be varied as desired. For example, different repeating patters may be used such as tall, tall, short, short, tall, tall, short, short, etc. Furthermore, if only a single container size is intended to be used with system 10, no variations in dram (or other container) holder height may be needed.

Once dram holder 40 is secured to the conveyor belt 22a, dram seat segment 40a extends substantially along a horizontal plane $P^H$ and dram securing segment 40b extends substantially along a vertical plane $P^V$ (FIG. 8).

Dram Handling

Figure 4:
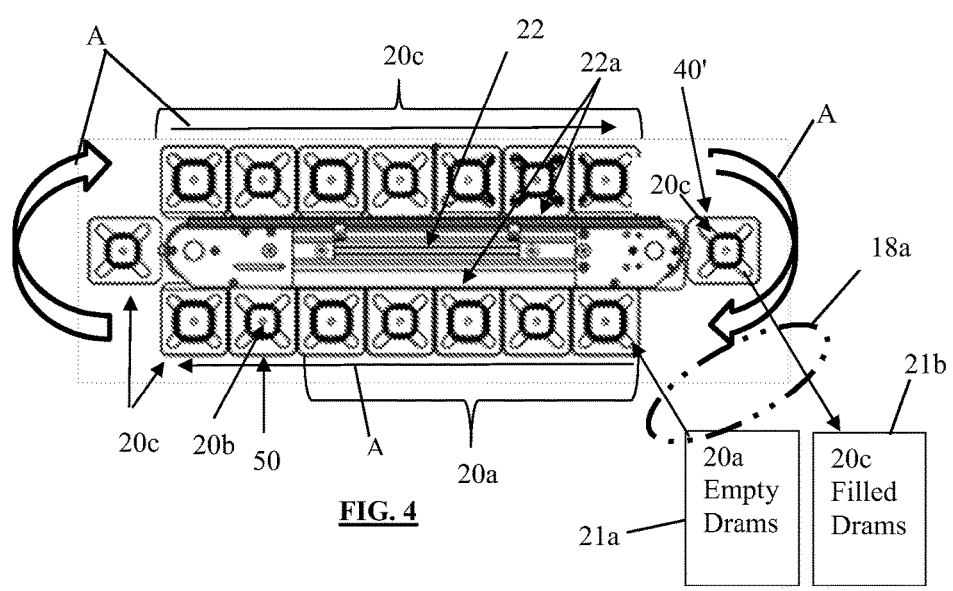
FIG. 4 is a top plan view of the conveyor system in FIG. 1.
Figure 5:
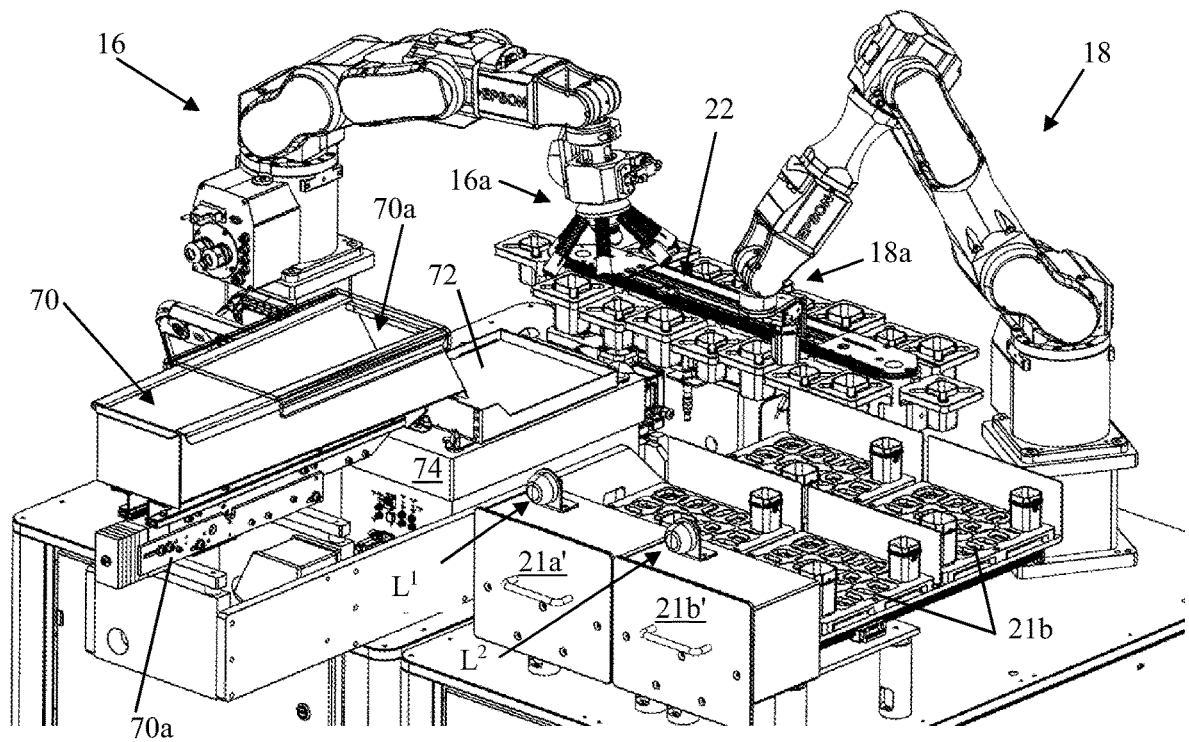
FIG. 5 is a perspective view taken from the right corner of FIG. 2 with portions of the support tables shown fragmented.
Figure 6:
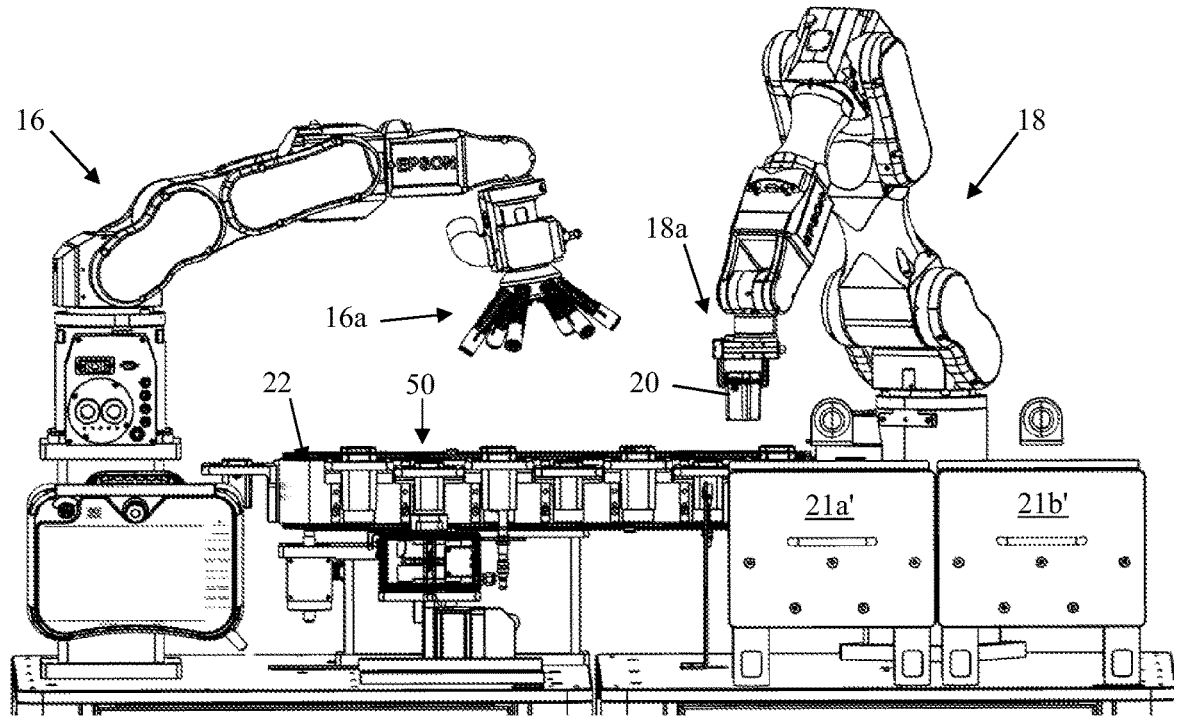
FIG. 6 is a perspective view taken from the front of FIG. 2 with portions of the support tables shown fragmented.

As seen best in FIGS. 3-5, empty drams 20a to be filled with product may be provided on one or more trays 21a whereby robot 18 may pick and place via EOAT 18a empty drams 20a into respective dram holders 40 on conveyor 22. In the illustrated embodiment, conveyor 22 moves clockwise in the direction of arrows "A" (FIG. 4) thereby incrementally delivering empty drams 20a to filling station 50 (a dram while positioned at filling station 50 is indicated by reference 20b regardless of its product fill status).

Once a dram has been filled at station 50, the filled dram identified by reference 20c proceeds via conveyor 22 until it reaches close to robot 18 see to the right in FIG. 4. Robot EOAT 18a picks the filled dram 20c from its respective dram holder 40' and places the filled dram 20c on a filled dram tray 21b.

The empty dram trays 21a and filled dram trays 21b may be provided in respective drawers 21a' and 21b' which may be alternately loaded and unloaded by a worker as needed. A dram tray status mechanism may be provided to alert a worker (or another robot, not shown) when one or more trays are ready to be loaded and unloaded from and from their respective locations. The status mechanism may be visual (e.g., lights $L^1$ and $L^2$ on drawers 21a' and 21b', respectively) and/or audible and/or wirelessly delivered to another device such as a computer at a distant work station and/or an alarm and/or text message delivered to a worker's smart phone, for example.

Any suitable status mechanism may be utilized for this purpose including, for example, touch or touchless sensors and/or switches connected to the drawers and/or trays and/or each dram seat in a tray. In one embodiment, the dram trays may be configured to have an opening at each dram seat which align over a respective proximity sensor provided in the respective drawer such that the presence or absence of a dram in the respective seat is discernable by the status mechanism. The status mechanism may be programmed to recognize the number of drams in the tray at any given time and/or generate a signal in response to sensing a full filled dram tray ready for unloading from drawer 21b' or a completely empty dram tray ready for replacing or loading with empty drams in drawer 21a'.

Dram transport robot EOAT 18a is operable to pick an empty dram 20a from an empty dram tray 21b and place the empty dram 20a either directly at a dram product filling station such as station 50 or onto a conveyor 22 (FIG. 4) or any other dram transport device which delivers an empty dram to the dram product filling station 50.

In the illustrated embodiment, EOAT 18a places the empty dram 20a into the center opening 40c of dram seat segment 40a (FIG. 7). Opening 40c may be configured to include one or more clearances 40d which allow the picking fingers $F^1$ and $F^2$ of the robot EOAT 18a to freely extend through clearances 40d when placing or picking a dram 20 from a respective dram holder 40. In this regard, it is seen that one or more edges $E^2$ are defined within opening 40c between clearances 40d, the edges $E^2$ each providing a ledge whereupon the edge $E^1$ of the dram may seat and locate in its respective dram holder 40 (FIG. 8). Once the dram is fully seated in its respective dram holder 40 an upper segment 20" including dram top edge 20' is raised above dram holder top surface 40a'.

As explained above, dram handling robot 18 may also be programmed to pick filled drams 20c from their respective dram holder 40' and place the filled dram 20c on a filled dram tray 21b. Once a tray is fully loaded the worker is alerted to unload the tray which may then undergo further handling for packaging and shipment.

It will thus be realized that dram handling robot 18 may be programmed to alternate between pick and place of empty drams 20a from tray 21a to respective dram holders 40 on conveyor 22, and pick and place of filled drams 20c from conveyor 22 to filled dram tray 21b.

Bud Delivery, Presentation, Selection, Picking and Dram Filling

Discussion is now turned to the bud delivery, presentation, selection, picking and dram filling operations.

Cannabis buds "B" are deposited by a worker into a hopper 70 having a front opening 70a wherethrough buds "B" may exit the hopper 70 and come to rest on a bud presentation tray 72. The bud presentation tray may include a vibration mechanism 74 which gently vibrates a group of buds B on so as to spread the buds out on the inspection tray 72. This facilitates individual bud vision inspection by vision system 23.

The dram filling process occurs at the dram filling station 50 wherein a dram 20b is positioned by conveyor 22. The dram filling robot 16 has at least one, but more preferably has two or more and, in the illustrated embodiment, six individual bud vacuum picking heads $P^1$-$P^6$ arranged on the EOAT 16a. Understanding that more than a single bud B is typically required to fill a single dram to the target weight, rather than picking and placing single buds B one at a time into a dram (i.e., in the order of pick, place, pick, place, pick, place, etc.) the provision of multiple picking heads allows the EOAT 16a to pick a group of buds B before moving to the dram for filling (i.e., in the order of pick, pick, pick, . . . pick (up to the number of individual picking heads on the EOAT), place).

A computer vision system 23 (FIG. 3) is operable to view and estimate the weight of individual buds B presented for picking by the dram filling robot 16. This may be done via density estimation software discussed further below. Dram filling robot EOAT 16a picks and places one or more individual buds B and B1-B8 (see FIGS. 3A, 5 and 7) into the dram 20b to the predetermined target weight (plus or minus an acceptable tolerance).

Figure 15A:
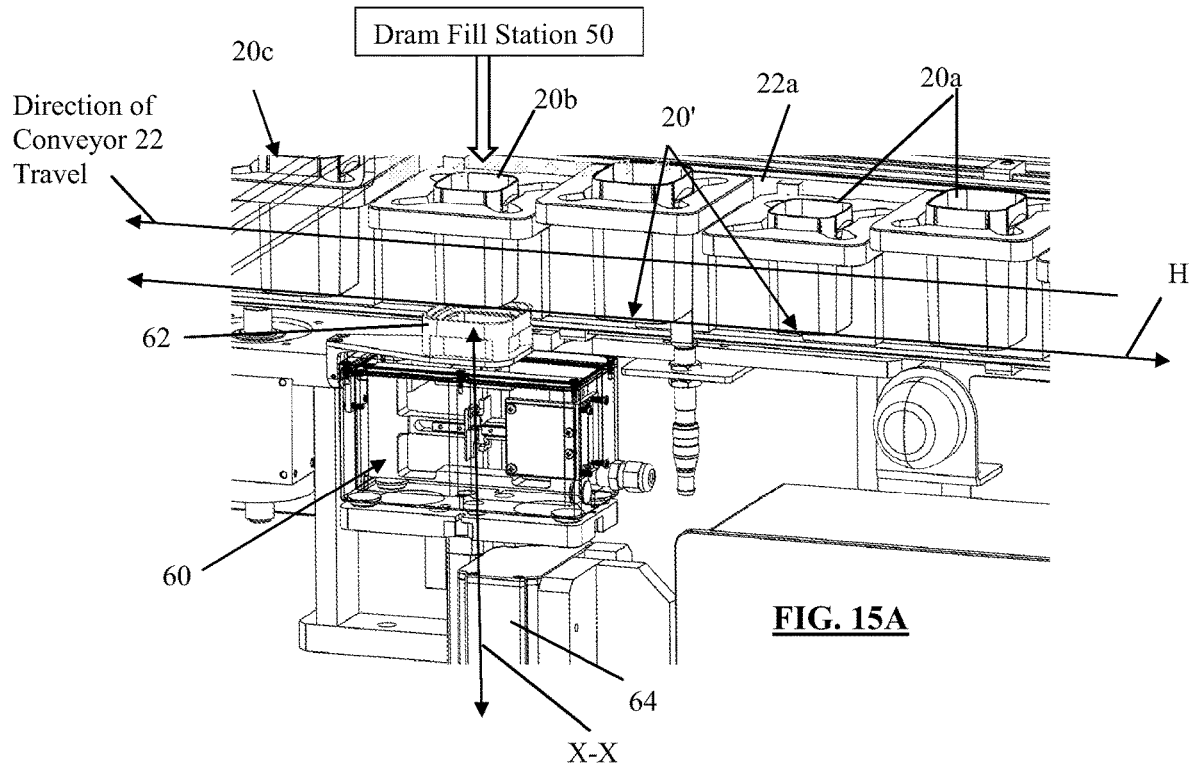
FIGS. 15A and 15B are a fragmented, perspective views of the dram filling and weigh station of the illustrated embodiment of the invention.
Figure 15B:
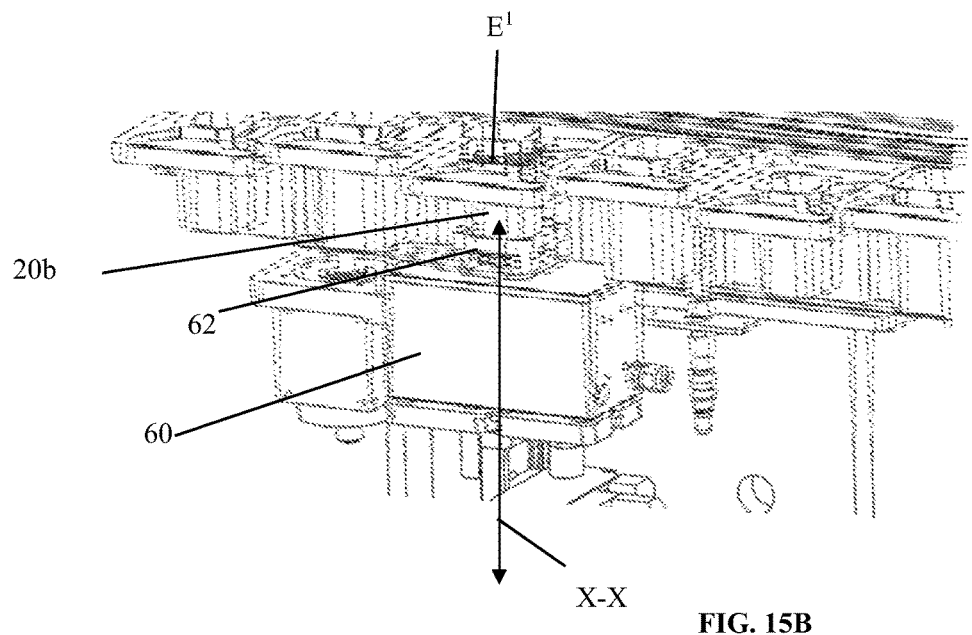

In an embodiment, each filled dram 20b is weighed which may be performed at the filling station 50. FIG. 15A illustrates the scale 60 and dram nest 62 in the lowered (retracted) position where dram 20b locates above nest 62 with both aligned along longitudinal axis X-X. Scale 60 is mounted to a linear actuator 64 which is operable to extend and move scale 60 along with nest 62 upwardly along axis X-X whereupon the bottom 20' of dram 20b becomes located in dram seat 62. As seen in FIG. 15B, upon full extension of actuator 64, nest 62 has raised dram 20b above dram seat edge $E^2$ such that the dram 20b is supported only by nest 62 whereupon the dram weight is read by scale 60.

A tare function may be performed to deduct the empty dram weight from the target weight. The weight of the dram 20b may be read in real time as it is being filled with buds B. The vision area to weight algorithm system (see FIG. 14A) may select buds B to be picked from tray 72 based on the proprietary vision area/volume to weight machine learning algorithm. The algorithm is operable to estimate the individual bud weight based on the product types calculated area density. This calculation is derived from product vision imaging, using the captured image calculated area and/or captured image calculated volume to solve for the net target weight of each bud B. This allows the robot EOAT 16a to fill individual dram 20b to the total desired target weight.

With a single pick EOAT and/or a multi-position pick EOAT such as EOAT 16a, the robot 16 via EOAT 16a picks buds B based on solving the target fill weight and then places that product into the dram 20b until it is of the target weight. Through real-time feedback from weight scale 60, the system determines the next best fill move for the product selected and this process continues until the target fill weight is achieved. As the system executes complete fill cycles the weight to density algorithm is automatically adjusted through the system's machine learning weight estimates to real weight results. Each product type (e.g., different cannabis strains) weight result can be saved with time stamps, Batch information, machine parameters, associated algorithm data, and/or select customer product information for the selected product. Once saved in the system database, product type "recipes" can be reused when that product type is selected in the future. The system also has the ability to be taught estimated area density of a product type in a teach procedure or calibration mode procedure. This procedure can be used for introducing new product types and/or prior product batch runs.

Thus, in an embodiment, a system is provided for packaging cannabis buds into individual containers each having a predetermined loaded target weight, comprising:
  a bud pick and place robot having an arm with a free end including a plurality of individual bud pickers;
  a bud picking tray adapted to receive and present for picking by said plurality of individual bud pick and place elements a plurality of cannabis buds; and
  a computer vision system electronically connected to said bud picker robot, said computer vision system having a camera operable to view and estimate the weight of individual buds on said bud picking tray;
  wherein said computer vision system, upon viewing and estimating the weight of a plurality of buds on said bud picking tray, is operable to direct said bud picker robot to pick a plurality of buds from said bud picking tray using said plurality of bud pickers, respectively, and deposit the picked buds, one at a time and in an amount to load a container to its predetermined loaded target weight.

In a further embodiment, the system further comprises a scale adapted to receive and calculate the weight of a loaded container, the system operable to compare the weight of the loaded container to said predetermined target weight.

In a further embodiment, the scale tares the weight of the container.

In a further embodiment, an alert is generated in response to the loaded container weight being different than a predetermined target weight.

In a further embodiment, a container pick and place robot is provided operable to pick and place an empty container from a first location to a second location, respectively, for depositing of buds into a container by the robot bud picker.

In a further embodiment, the container pick and place robot is further operable to pick a loaded container from a second location and place the loaded container at a third location.

In a further embodiment, the second location is a container holder.

In a further embodiment, the container holder is attached to a moving conveyor.

In a further embodiment, the conveyor is an endless belt lying along a vertical plane and a plurality of container holders are attached in linearly spaced relation along and traversing said endless belt, the container holders adapted to removably receive a respective plurality of containers maintained in upright positions along the full circuit of the endless belt.

In a further embodiment, the plurality of individual bud pickers are arranged on a picker head, and a vision system operable to cause the robot arm to rotate the picker head so as to position a desired one of the plurality of individual bud pickers above a bud selected by the vision system to be picked from the bud picking tray based on the estimated weight of the bud as calculated by the computer vision system.

In a further embodiment, the computer vision system is operable to detect when the plurality of individual pickers have picked the buds which collectively weigh the estimated target weight of the container to be filled.

In a further embodiment, the computer vision system is operable to instruct and cause the picking robot to deposit the picked buds into the container to be filled.

In a further embodiment, the computer vision system is operable to instruct and cause the bud picking robot to deposit the picked buds one at a time into the container to be filled.

In a further embodiment, the computer vision system is operable to instruct and cause the bud picking robot and plurality of picking heads to deposit the picked buds one at a time into the container to be filled in descending weight order.

In a further embodiment, the computer vision system is operable to instruct the bud picking robot and plurality of picking heads to deposit the picked buds one at a time into the container to be filled in ascending weight order.

In a further embodiment, a first module is provided having one or more support elements to which the bud pick and place robot is mounted.

In a further embodiment, a second module is provided having one or more support elements to which the container pick and place robot is mounted As used herein, the term "product item" and variations thereof encompasses the term "bud," which refers to cannabis bud(s), and variations thereof, as well as other products.

As used herein, the term "processor" and variations thereof (e.g., processors, processing, etc.) refers to electronic circuits that can process incoming data and provide an output based on the incoming data. Examples of "processor" includes virtual processors (e.g., virtual machines), siliconbased processors, central processing units (CPUs), graphics processing units (GPUs), integrated circuits, special purpose circuits (e.g., field-programmable gate arrays (FPGAs)) and systems on chip (SoCs). Future processor types are also intended to be included, for example, processors based in whole or in part on carbon nanotubes, graphene, alloys of elements from groups three to five of the Periodic Table and quantum processors. Quantum processors use quantum superposition to represent bits, referred to as "qubits," rather than just an on or off state (i.e., zeros and ones).

As used herein, the terms "computing unit" or "computing device" and variations thereof refers to a machine having one or more processors, as defined herein, memory for storing processor-executable instructions to perform one or more functions and one or more input/output devices. Examples include a general or special purpose computer, smart phones, tablets, etc.

As used herein, the term "size" and variations thereof, when used with product items or buds refers to a relative size in relation to other product items or buds in the same digital image thereof. Alternatively, the size can be determined using two or more predetermined size ranges, for example, small, medium and large.

Figure 14B:
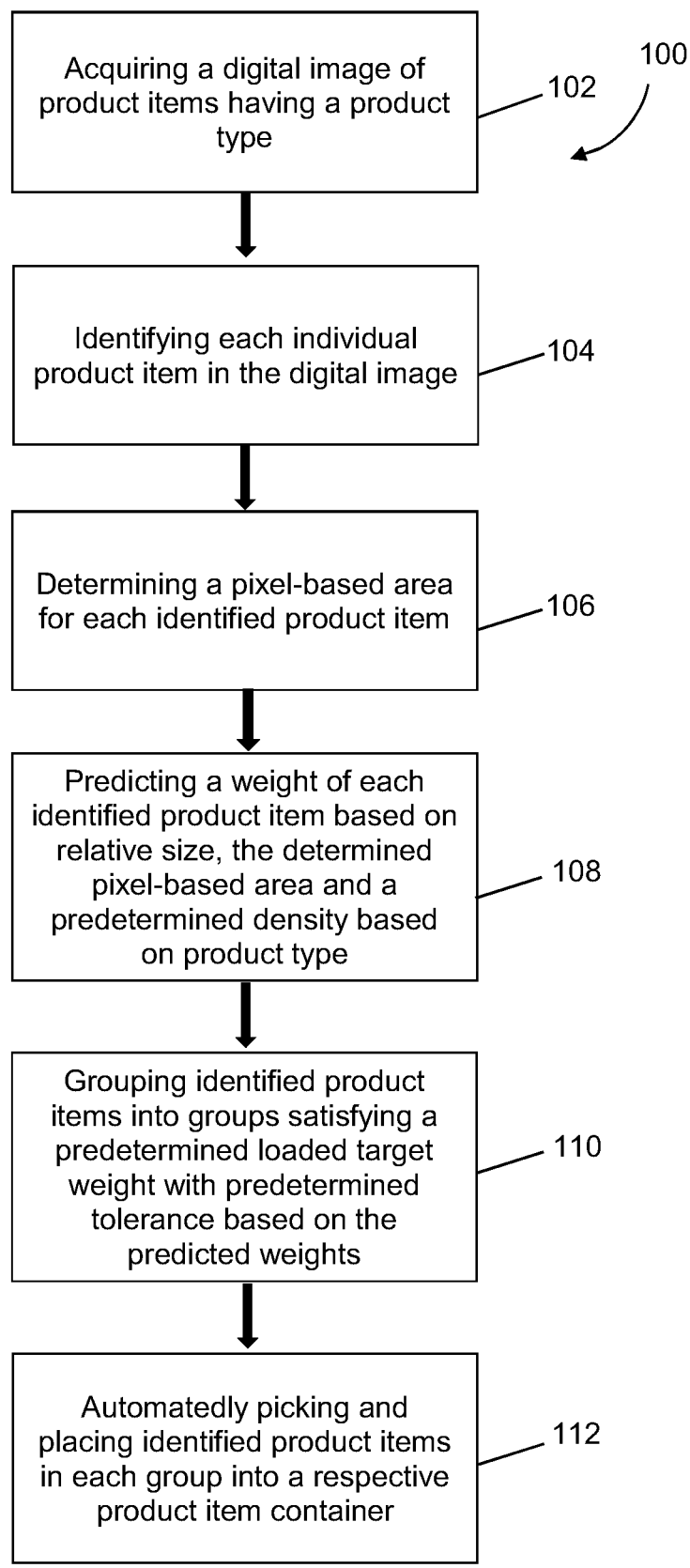
FIG. 14B is a flow diagram of an embodiment of the computer vision system associated with the dram or product item container handling, bud picking and dram filling operations, in accordance with one or more aspects of the present invention.

FIG. 14B is a flow diagram 100 for one example of operation of the computer vision system of FIG. 14A used with the packaging system disclosed herein. Computer vision is a field of artificial intelligence that enables computing units and systems to derive meaningful information from digital images, videos and other visual inputs and take action(s) or make recommendations based on that information. Returning to FIG. 14B, a digital image of a plurality of product items having a product type, for example, buds of a particular strain, is acquired (102). Each individual product item in the digital image is identified (104). A pixel-based area is determined for each identified product item in the image (106). The computer vision system predicts a weight for each identified product item, based on, in one example, a relative size thereof, e.g., relative to other identified product items in the digital image, the determined pixel-based area and a predetermined density based on the product type (108). Using the predicted weights of the identified product items, the computer vision system groups the identified product items into groups, each group satisfying a predetermined loaded target weight (110). The automated pick and place process then picks the identified product items in a group and places them, e.g., one at a time, into a product item container (112).

In one example, there can be any number of the picking "fingers" of the robot EOAT 18a, for example, two or more fingers.

In another example, the size of the product items is relative to other of the same type of product item in the digital image. Necessarily, where the size is relative, the sizes for the product items are not uniform. In an example, the sizes may fall into at least two size ranges (e.g., three size ranges for small, medium and large).

As stated above, the weight of dram 20b may be read in real time as it is being filled with buds B. The computer vision system 23 (see FIGS. 3 and 14A) may cause the selection of buds B to be picked from tray 72 based on the proprietary vision area/volume to weight machine learning algorithm. The algorithm is operable to predict the individual bud weight based on the product types density, which, in one example, is derived from the area in the image of a bud and/or volume, to solve for a target weight of each bud B. This allows the robot EOAT 16a to fill individual dram 20b to the total desired target weight.

Figure 17:
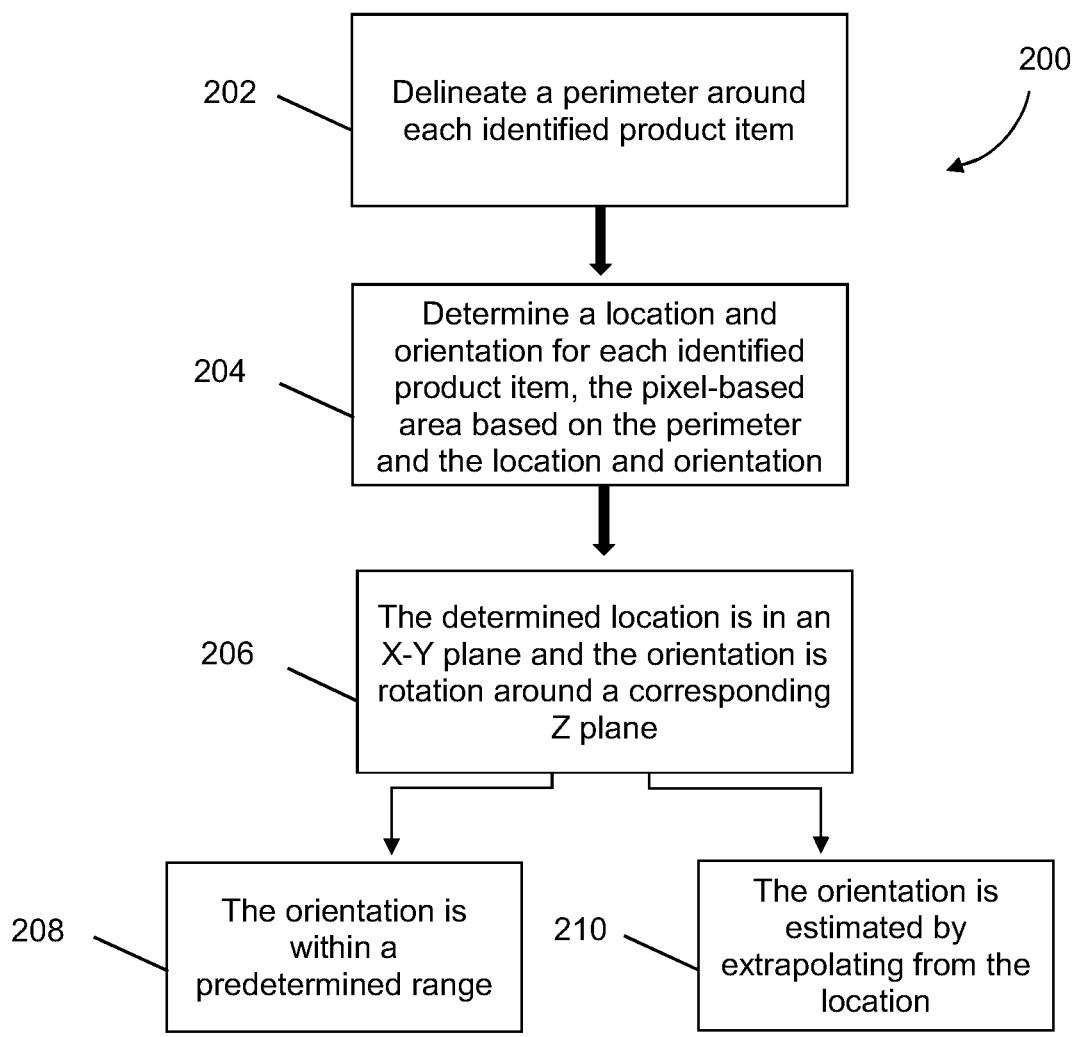
FIG. 17 is a flow diagram for one example of predicting a weight for each bud or product item, in accordance with one or more aspects of the present invention.

FIG. 17 is a flow diagram 200 for one example of determining a pixel-based area for each identified product item in the digital image. A perimeter is delineated around each identified product item (202). A location and orientation for each identified product item (204) is determined, the pixel-based area based on the perimeter, location and orientation. For example, the location may be in an X-Y plane, while the orientation may be rotation around a corresponding Z plane (206). In one example, the orientation may be within a predetermined range (208). As another example, the orientation may be estimated, for example, by extrapolating from the location (210). Algorithms for extrapolating the orientation from the location are well known in the art.

In an embodiment, the computer vision system is operable to view and predict the weight of individual product items presented for picking by the product item pick and place robot. This may be done via density prediction discussed further below. Machine learning may be used to teach the predicting algorithm, as well as to keep the product item weight prediction database updated.

Figure 18:
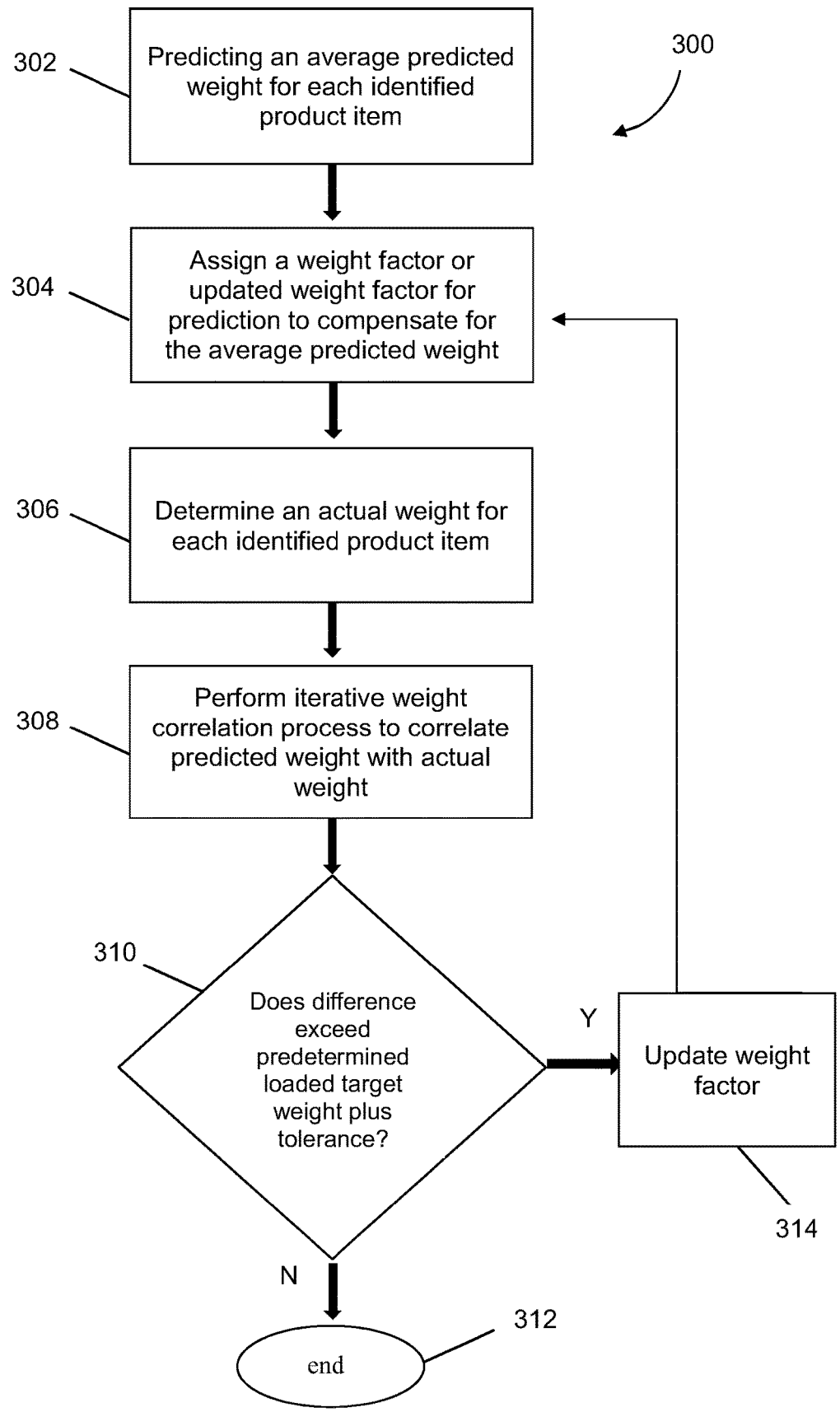
FIG. 18 is a flow diagram for one example of weighing a dram or product item container during the pick and place process, in accordance with one or more aspects of the present invention.

FIG. 18 is a flow diagram 300 for one example of predicting the product item weights. In one example, the prediction may be an average weight across several types of product items (302). Since an average predicted weight across several product item types is inherently inaccurate for a given product item, a weight factor is assigned to compensate for the inaccuracy (304). An actual weight for each identified product item is determined (306). With the actual weights of the identified product items, an iterative weight correlation process may be performed to correlate the predicted and actual weights (308). An inquiry (310) is then made as to whether the difference between predicted and actual weights for a given identified product item exceeds the predetermined loaded target weight plus a predetermined tolerance. If the difference is equal to or within the tolerance of the predetermined loaded target weight, a "Yes" answer to inquiry 310, the process ends (312). If the actual weight exceeds the tolerance of the predetermined loaded target weight, a "No" answer to inquiry 310, the weight factor is then updated (314) and the process returns to assigning a weight factor (304).

Figure 19:
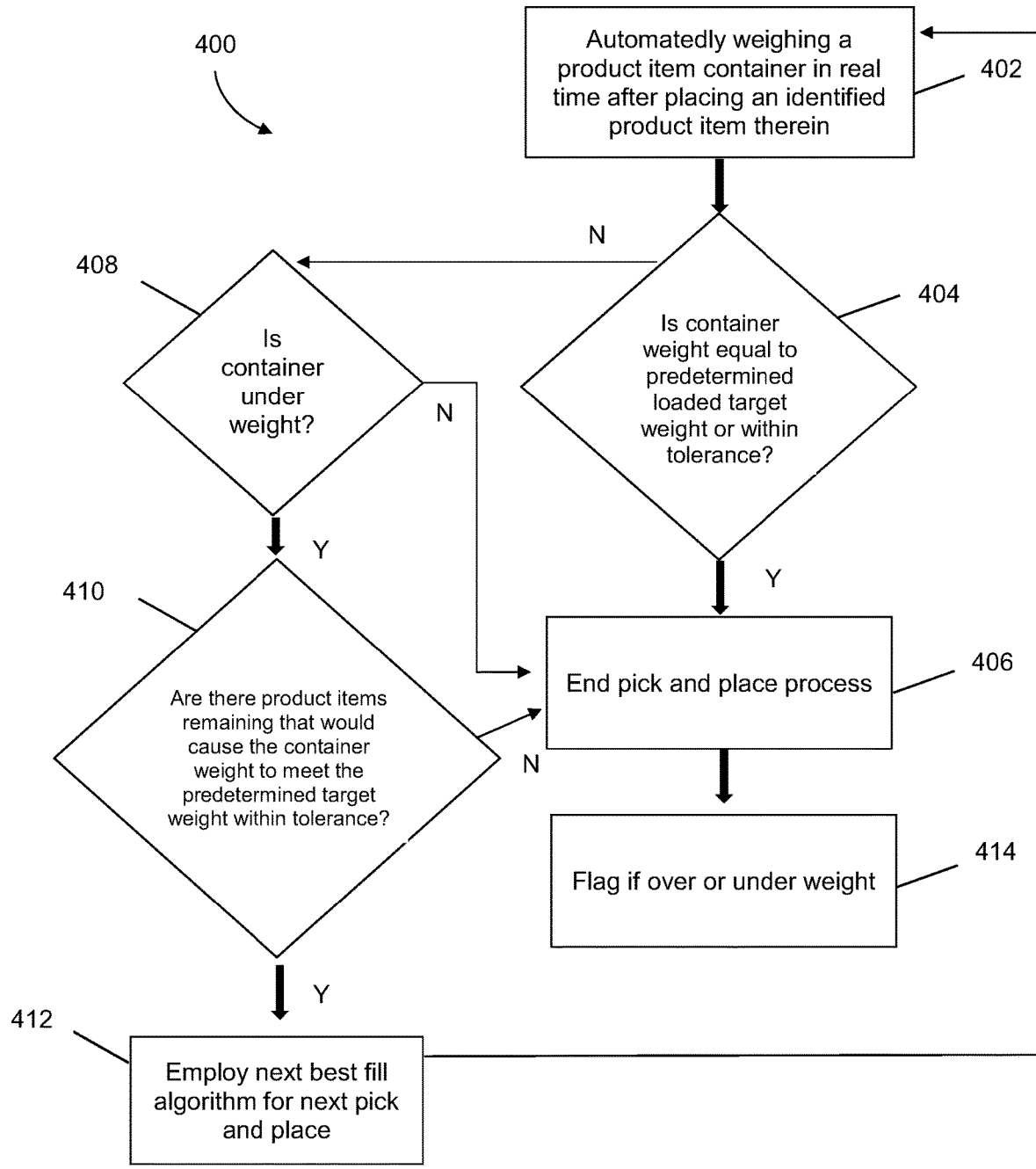
FIG. 19 is a flow diagram for one example of automatedly weighing the product item container continually in real time and ending the automated picking and placing when the product item container reaches the predetermined target weight within a predetermined tolerance, in accordance with one or more aspects of the present invention.

FIG. 19 is a flow diagram 400 for one example of automatedly weighing the product item container continually in real time and ending the automated picking and placing when the product item container reaches the predetermined target weight within a predetermined tolerance. In one example, during the pick and place process, the computer vision system automatedly weighs (e.g., using output from a scale) a given product item container in real time after placing each product item of a group into the corresponding product item container for that group (402). An inquiry is then made as to whether the actual container weight is equal to or with a tolerance of the predetermined loaded target weight (404). If so, a "Yes" answer to inquiry 404, the pick and place process for that product item container ends (406). If the container weight is equal to or within a tolerance of the predetermined loaded target weight, a "No" answer to inquiry 404, then an inquiry is made as to whether the product item container is under weight (408). If the product item is under weight, another inquiry is made as to whether any of the remaining identified product items would cause the container to meet the predetermined loaded target weight plus predetermined tolerance (410). If there is one or more remaining identified product items that would meet the target weight with tolerance, a next best fill algorithm, known to one skilled in the art, is employed for a next product item pick and place (412) and the process returns to automatedly weighing the product item container (402). If either the product item container is not under weight, a "No" answer to inquiry 408, or if there are no remaining identified product items that would meet the target weight plus tolerance, a "No" answer to inquiry 410, the pick and place process for that identified product item ends (406). Also, if the identified product item container remains under weight, that container is flagged (414).

Figure 20:
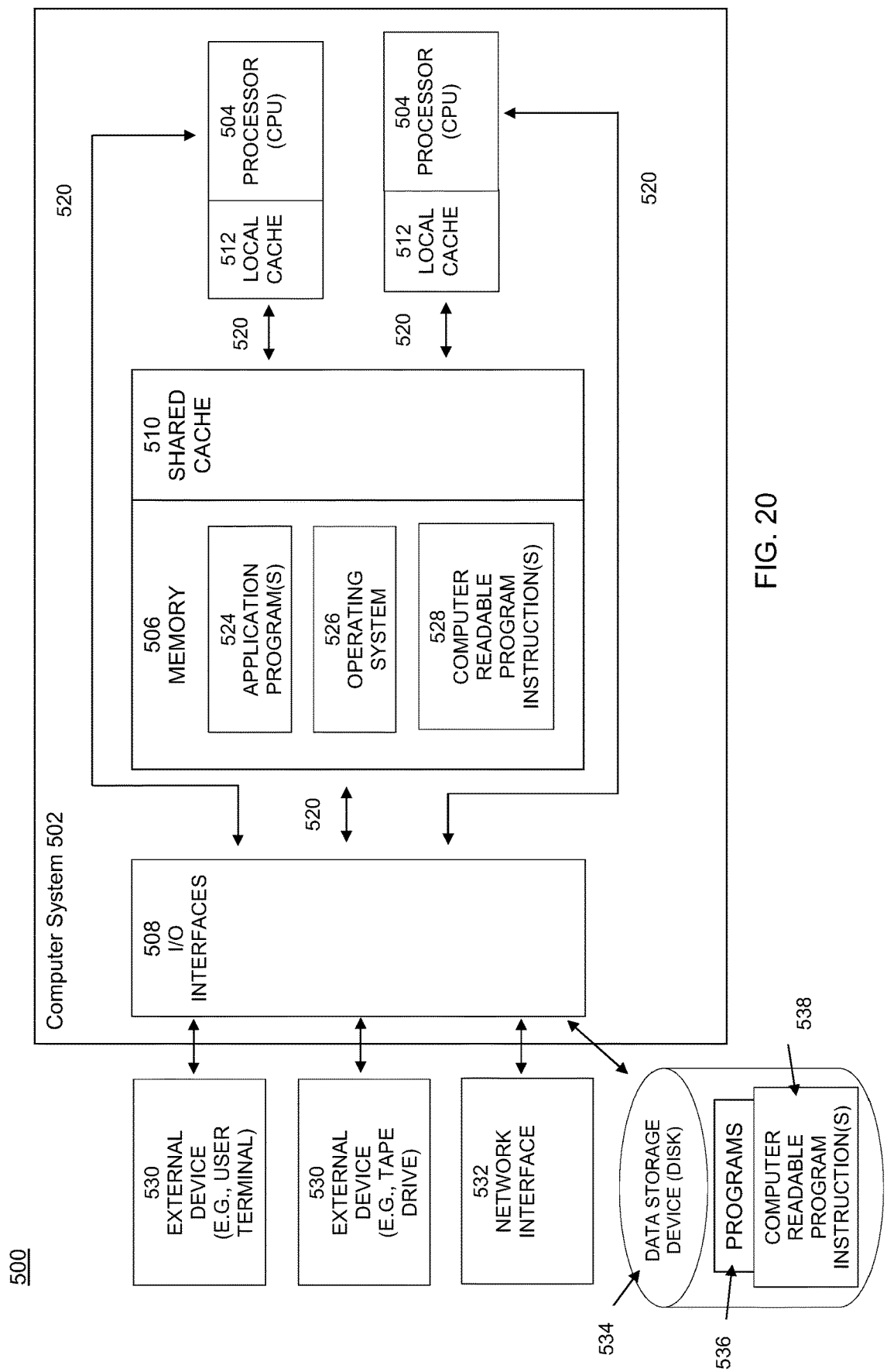
FIG. 20 is a block diagram of one example of a computing unit and environment useful with the present invention, in accordance with one or more aspects of the present invention.

FIG. 20 is a block diagram of one example of a computing environment useful with the present invention. Shown in FIG. 20, a computing environment 500 includes, for instance, a computer system 502 shown, e.g., in the form of a computing device. However, it will be understood that virtual network(s) or cloud-based network(s) may instead be used. Computer system 502 may include, but is not limited to, one or more processors or processing units 504 (e.g., central processing units (CPUs)), a memory 506 (a.k.a., system memory, main memory, main storage, central storage or storage, as examples), and one or more input/output (I/O) interfaces 508, coupled to one another via one or more buses and/or other connections 520.

Bus 520 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 506 may include one or more programs or applications 524, an operating system 526, and one or more computer readable program instructions 528. Computer readable program instructions 528 may be configured to carry out functions of embodiments of aspects of the invention. Memory 506 may include, for instance, a cache 510, such as a shared cache, which may be coupled to local caches 512 of processors 504.

Computer system 502 may also communicate via, e.g., I/O interfaces 508 with one or more external devices 530, one or more network interfaces 532, and/or one or more data storage devices 534. Example external devices include a user terminal, a tape drive, a solid state drive, a pointing device, a display, etc. Network interface 532 enables computer system 502 to communicate with one or more networks, such as a local area network (LAN), a general wide area network (WAN), and/or a public network (e.g., the Internet), providing communication with other computing devices or systems.

Data storage device 534 (a particular example of an external device) may store one or more programs 536, one or more computer readable program instructions 538, and/or data, etc. The computer readable program instructions may be configured to carry out functions of embodiments of aspects of the invention.

Computer system 502 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM, flash memory, or other storage media. It should be understood that other hardware and/or software components could be used in conjunction with computer system 502. Examples include, but are not limited to: microcode, device drivers, redundant processing units, external disk drive arrays, RAID systems, tape drives, and data archival storage systems, etc.

Computer system 502 may be operational with numerous other computing system environments or configurations. Examples of well-known computing systems, environments, and/or configurations that may be suitable for use with computer system 502 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In accordance with an aspect of the present invention, a processor, such as processor 504, executes one or more programs or applications (e.g., applications 524) that request data accesses (e.g., in one or more levels of memory—main memory and/or one or more levels of cache).

Figure 21:
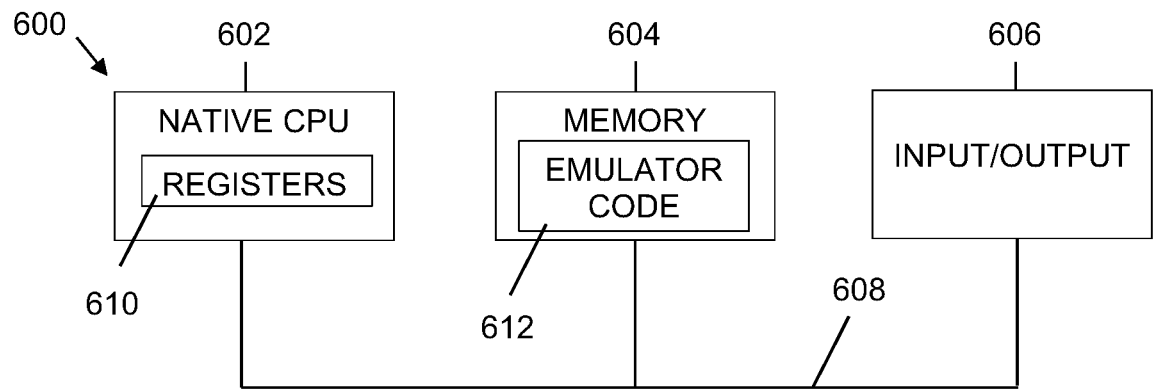
FIGS. 21 and 22 are block diagrams of another example of a computing unit useful with the present invention, in accordance with one or more aspects of the present invention.

Other types of computing environments may also incorporate and use one or more aspects of the present invention, including, but not limited to, emulation environments, an example of which is described with reference to FIG. 21. In this example, a computing environment 600 includes, for instance, a native central processing unit (CPU) 602, a memory 604, and one or more input/output devices and/or interfaces 606 coupled to one another via, for example, one or more buses 608 and/or other connections.

Native central processing unit 602 includes one or more native registers 610, such as one or more general purpose registers and/or one or more special purpose registers used during processing within the environment. These registers include information that represents the state of the environment at any particular point in time.

Moreover, native central processing unit 602 executes instructions and code that are stored in memory 604. In one particular example, the central processing unit executes emulator code 612 stored in memory 604. This code enables the computing environment configured in one architecture to emulate another architecture. For instance, emulator code 612 allows machines based on various architectures, or other servers or processors, to emulate a desired architecture and to execute software and instructions developed based on that hardware architecture.

Figure 22:
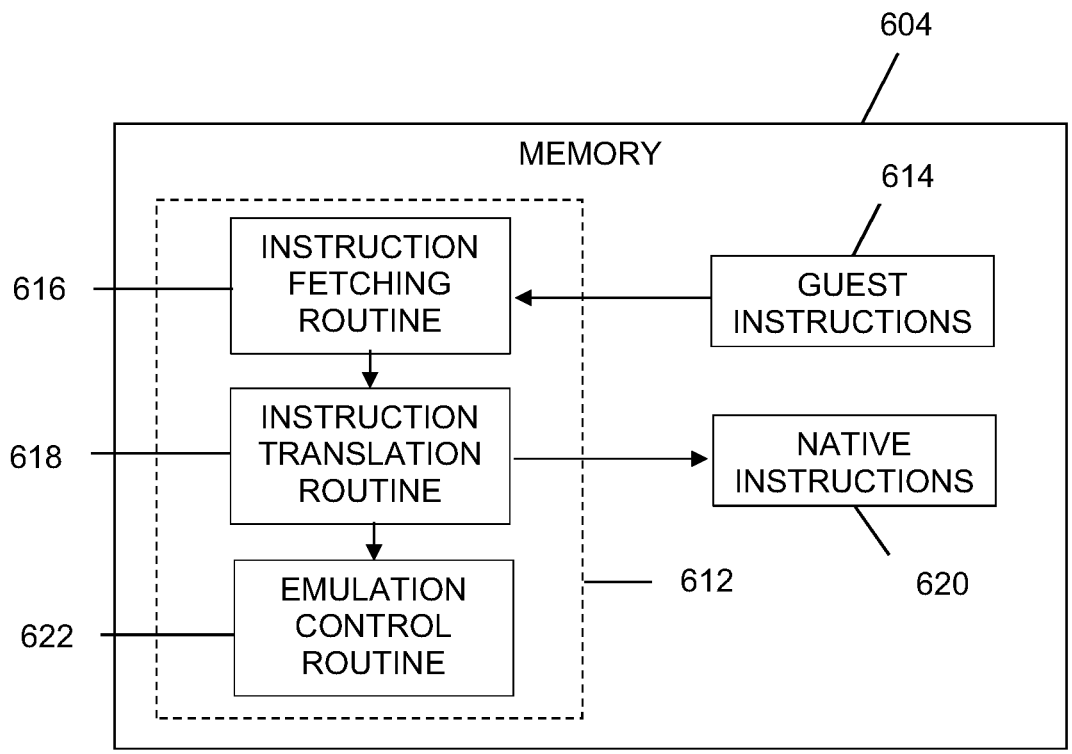

Further details relating to emulator code 612 are described with reference to FIG. 22. Guest instructions 614 stored in memory 604 comprise software instructions (e.g., correlating to machine instructions) that were developed to be executed in an architecture other than that of native CPU 602. For example, guest instructions 614 may have been designed to execute on a particular processor architecture, but instead, are being emulated on native CPU 602. In one example, emulator code 612 includes an instruction fetching routine 616 to obtain one or more guest instructions 614 from memory 604, and to optionally provide local buffering for the instructions obtained. It also includes an instruction translation routine 618 to determine the type of guest instruction that has been obtained and to translate the guest instruction into one or more corresponding native instructions 620. This translation includes, for instance, identifying the function to be performed by the guest instruction and choosing the native instruction(s) to perform that function.

Further, emulator code 612 includes an emulation control routine 622 to cause the native instructions to be executed. Emulation control routine 622 may cause native CPU 602 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 620 may include loading data into a register from memory 604; storing data back to memory from a register; or performing some type of arithmetic or logic operation, as determined by the translation routine.

Each routine is, for instance, implemented in software, which is stored in memory and executed by native central processing unit 602. In other examples, one or more of the routines or operations are implemented in firmware, hardware, software, machine language or some combination thereof. The registers of the emulated processor may be emulated using registers 610 of the native CPU or by using locations in memory 604. In embodiments, guest instructions 614, native instructions 620 and emulator code 612 may reside in the same memory or may be disbursed among different memory devices and/or virtual memory.

A guest instruction 614 that is obtained, translated and executed may be, for instance, one of the instructions described herein. The instruction, which is of one architecture, is fetched from memory, translated and represented as a sequence of native instructions 620 of another architecture. These native instructions are then executed.

In one aspect, the present invention provides a system for packaging product items (e.g., cannabis buds) of a same type into individual containers, each container having a predetermined loaded target weight. The system includes a product item pick and place robot having an arm with a free end including individual product item pickers; a product item picking tray adapted to receive and present for picking by the individual product item pickers, a number of product items. The system further includes a computer vision system electrically coupled to the product item pick and place robot, the computer vision system having imaging sensor(s) (e.g., as part of a camera) operable to view individual product items on the product item picking tray and predicting weights thereof. The computer vision system, based on the predicted weights of the product items on the product item picking tray and identified in the digital image (within the field of view), is operable to direct the product item pick and place robot to pick product item(s) from the product item picking tray using the individual product item picker(s), respectively, and depositing the picked product item(s), e.g., one at a time, and in an amount to load a container to its predetermined loaded target weight.

The system may further include, for example, a scale adapted to receive and determine a weight of a loaded container, the system operable to compare the weight of the loaded container to the predetermined loaded target weight. In one example, the scale may tare or deduct the actual weight of the container (empty). In another example, an alert is generated based on the loaded container weight being different than the predetermined loaded target weight.

The system may also include, for example, a container pick and place robot operable to pick and place an empty container from a first location to a second location, respectively, for depositing of the picked product item(s) into a container by the individual product item pickers. In one example, the container pick and place robot is further operable to pick a loaded container from the second location and place the loaded container at a third location. In one example, the second location may be a container holder. In another example, the container holder may be attached to a moving conveyor. In still another example, the moving conveyor may be an endless belt lying along a horizontal plane and container holders may be attached thereto in linearly spaced relation along and traversing the endless belt, the container holders adapted to removably receive a respective containers maintained in upright positions along a full circuit of the endless belt. In still another example, the system with the container pick and place robot may include a first module having support element(s) to which the product item pick and place robot is mounted. In a further example, the system with the first module may include a second module having support element(s) to which the container pick and place robot is mounted.

The individual product item pickers of the system may be arranged on a picker head, the computer vision system operable to cause the arm to rotate the picker head so as to position a desired one of the individual product item pickers above a product item selected by the computer vision system to be picked from the product item picking tray based on the predicted weight of the product item as determined by the computer vision system. In one example, the computer vision system may be operable to detect when the individual product item pickers have picked the product item(s) that collectively weigh, within a predetermined tolerance, the predetermined loaded target weight of the container to be filled. In another example, the computer vision system may be operable to instruct and cause the product item pick and place robot to deposit the picked product item(s) into the container to be filled. In still another example, the computer vision system may be operable to instruct and cause the product item pick and place robot to deposit the picked product item(s), for example, one at a time, into the container to be filled. In yet another example, the computer vision system is operable to instruct and cause the product item pick and place robot and the picking heads to deposit the picked product item(s), e.g., one at a time, into the container to be filled in descending weight order. In an alternate example, the computer vision system may be operable to instruct the product item pick and place robot and the individual product item pickers to deposit the picked product item(s), for example, one at a time, into the container to be filled in ascending weight order.

In still another example, the system with the container pick and place robot may include a first module having support element(s) to which the product item pick and place robot is mounted. In a further example, the system with the first module may include a second module having support element(s) to which the container pick and place robot is mounted.

In an alternate example, the computer vision system may be operable to instruct the product item pick and place robot and the individual product item pickers to deposit the picked product item(s), for example, one at a time, into the container to be filled in ascending weight order.

In another aspect, the computer vision system includes a processor in communication with a non-transitory memory storing computer readable instructions executable by the processor for performing a method. The method includes, for example, acquiring a digital image of product items having a product type; identifying each individual product item in the digital image, resulting in identified product item(s); determining a pixel-based area for each identified product item. The method performed by the system may also include predicting a weight of each of the identified product items based on a relative size thereof, the determined pixel-based area and a predetermined density based on, for example, the product type; grouping, based on the predicted weights, the identified product items into groups, each group satisfying the predetermined loaded target weight; and automatedly picking and placing the determined product item(s) of each of the groups into a product item container.

In one example, acquiring a digital image of buds or product items includes using imaging sensor(s). For example, the imaging sensor(s) may be part of a camera controlled by the computer vision system.

In another example, the identifying aspect of the method performed by the system may further include delineating a perimeter, e.g., a pixel-based delineation, around each individual product item, the pixel-based area including a pixel-based area encompassed by the perimeter. The method performed by the system may further include determining a location and orientation for each identified product item in the digital image, the pixel-based area encompassed by the perimeter may be further based on the location and orientation. In one example, the location includes a location in an X-Y plane and the orientation includes rotation around a Z plane. Further, the orientation may be within a predetermined range. In another example, the orientation may be estimated by extrapolating from the location using various algorithms known to one skilled in the art.

In still another example, each of the predicted weights may be an average predicted weight and the predicting may include assigning a weight factor to compensate for inaccuracy of the average predicted weight. The method performed by the system may further include determining an actual weight of each individual product item and the predicting may include performing an iterative weight correlation process to correlate the predicted weight with an actual weight and updating the weight factor when the iterative weight correlation process indicates a difference between the predicted weight and the actual weight exceeding a predetermined weight tolerance. The outcome of the correlation process is the weight factor. In one example, based on the iterative weight correlation process indicating the difference exceeds the predetermined weight tolerance, the method may further include updating the weight factor. The predicted weight may be based on the updated weight factor, a size of each individual product item, the pixel-based area and a predetermined density based on product type. In one example, the weight factor may be predetermined according to product type and size.

The system of the present application may have, for example, three modes of operation: calibration mode (e.g., at startup); full operation mode; and validation mode (validation of an individual product item or of a loaded product item container). In one example, the weight correlation process may initially be run during calibration mode.

In yet another example, the predicting of the method performed by the system may be performed by a computing unit trained via machine learning using, for example, supervised machine learning initially, then gradually moving to unsupervised learning. The training data may have, for example, an adjustable threshold to avoid out-of-bounds data.

The method performed by the system may further include classifying each identified product item in the digital image according to a classified size.

In one example, product items may include plant-based product items. In another example, the plant-based product items may include buds.

In another example, the grouping of the method performed by the system may include using a best fit algorithm.

The automatedly picking and placing of the method performed by the system may be, for example, performed by a product item pick and place robot. In one example, the product item pick and place robot may include a rotatable picker head(s) having individual product item pickers, each of the individual product item pickers employing suction as part of the automatedly picking and placing.

The method performed by the system may further include, for example, validating a cumulative predicted weight, the validating including weighing the loaded product item container and comparing to the cumulative predicted weight in order to confirm the cumulative predicted weight is within a predetermined tolerance of the actual weight of the loaded product item container.

In one example, the method performed by the system may further include automatedly weighing the product item container continually in real time and ending the automatedly picking and placing when the product item container reaches the predetermined loaded target weight within a predetermined tolerance. In another example, automatedly weighting the product item container may include continually doing so in real time and, based on a real-time weight of the product item container, employing a next best fill algorithm to pick a next best product item to place in the product item container. After ending the automated picking and placing, a product item container may be flagged for removal based on the product item container having a weight exceeding the predetermined loaded target weight by a predetermined tolerance. In another example, after ending the automated picking and placing, a product item container may be flagged for removal based on the product item container having a weight under the predetermined loaded target weight by a predetermined tolerance.

In one example, the real-time weighing via the scale of a product item container allows for confirming the predicted weights of individual product items or buds. As buds are added to a product item container, necessarily one by one, the difference in weight before and after placing a bud can be used to get an actual weight of a given bud. These actual bud weights can be stored for later use in comparing predicted to actual weight for one or more buds. As an example, this procedure may be used for one or more product item containers flagged as over or under the predetermined loaded target weight.

In one example, weight results of product items and containers may be stored, for example, in a database. In another example, the database may also store additional related information, for example, product, product type, time stamp, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on one computer, partly on the one computer, as a stand-alone software package, partly on the one computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (or flow diagrams) and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

Although the invention has been described with reference to preferred embodiments thereof, it is understood that various modifications may be made thereto without departing from the full spirit and scope of the invention as defined by the claims which follow.

What is claimed is:

1. A system for packaging cannabis buds into individual containers each having a predetermined loaded target weight, comprising:
    a) a bud pick and place robot having an arm with a free end including a plurality of individual bud pickers;
    b) a bud picking tray adapted to receive and present for picking by said plurality of individual bud pick and place elements a plurality of cannabis buds; and
    c) a computer vision system electronically connected to said bud picker robot, said computer vision system including a processor in communication with a non-transitory memory storing computer readable instructions executable by the processor for performing a method, the method comprising the steps of:
        i) acquiring a digital image of a plurality of product items having a product type;
        ii) identifying each of the plurality of product items in the digital image, resulting in one or more identified product items;
        iii) determining a pixel-based area for each of the one or more identified product items;
        iv) predicting a weight of each of the one or more identified product items based on a size thereof, the determined pixel-based area and a predetermined density based on the product type, the step of predicting resulting in a plurality of predicted weights;
        v) grouping, based on the plurality of predicted weights, the one or more identified product items into a plurality of groups, each group satisfying the predetermined loaded target weight; and
        vi) automatedly picking and placing each of the plurality of groups into a product item container.

2. The system of claim 1, wherein the step of acquiring comprises using one or more imaging sensors.

3. The system of claim 1, wherein the step of identifying further comprises delineating a perimeter around each of the one or more identified product items and wherein the pixel-based area comprises a pixel-based area encompassed by the perimeter.

4. The system of claim 3, further comprising determining a location and orientation for each of the one or more identified product items in the digital image, wherein the pixel-based area encompassed by the perimeter is further based on the location and orientation.

5. The system of claim 4, wherein the location comprises a location in an X-Y plane, wherein the orientation comprises rotation around a Z plane and wherein the orientation is within a predetermined range.

6. The system of claim 4, wherein the location comprises a location in an X-Y plane, wherein the orientation comprises rotation around a Z plane and wherein the orientation is estimated by extrapolating from the location.

7. The system of claim 1, wherein each of the plurality of predicted weights comprises an average predicted weight and wherein the predicting comprises assigning a weight factor to compensate for inaccuracy of the average predicted weight.

8. The system of claim 7, further comprising determining an actual weight of each of the one or more identified product items, wherein the predicting comprises performing an iterative weight correlation process to correlate the predicted weight with an actual weight and updating the weight factor when the iterative weight correlation process indicates a difference between the predicted weight and the actual weight exceeds a predetermined weight tolerance.

9. The system of claim 7, wherein the iterative weight correlation process indicates the difference exceeds the predetermined weight tolerance, the method further comprising updating the weight factor, wherein the predicted weight is based on the updated weight factor, a size of each individual product item, the pixel-based area and a predetermined density based on product type.

10. The system of claim 7, wherein the weight factor is predetermined according to product type and size.

11. The system of claim 1, wherein the predicting is performed by a computing unit trained via machine learning.

12. The system of claim 1, further comprising classifying each individual product item in the digital image according to size, the classifying resulting in a classified size for the each individual product item, and wherein the size comprises the classified size.

13. The system of claim 1, wherein the plurality of product items comprises a plurality of plant-based product items.

14. The system of claim 13, wherein the plurality of plant-based items comprises a plurality of buds.

15. The system of claim 1, wherein the grouping comprises using a best fit algorithm.

16. The system of claim 1, wherein the automatedly picking and placing is performed by a product item pick and place robot.

17. The system of claim 16, wherein the product item pick and place robot comprises a rotatable picker head having a plurality of individual product item pickers, each of the plurality of individual product item pickers employing suction as part of the automatedly picking and placing.

18. The system of claim 1, further comprising validating a cumulative predicted weight, the validating comprising weighing the loaded product item container and comparing to the cumulative predicted weight in order to confirm the cumulative predicted weight is within a predetermined tolerance of an actual weight of the loaded product item container.

19. The system of claim 1, further comprising automatedly weighing the product item container continually in real time and ending the automatedly picking and placing when the product item container reaches the predetermined loaded target weight within a predetermined tolerance.

20. The system of claim 19, further comprising automatedly weighing the product item container continually in real time and, based on a real-time weight of the product item container, employing a next best fill algorithm to pick a next best product item to place in the product item container.

21. The system of claim 19, further comprising, after ending the automatedly picking and placing, flagging a product item container for removal based on the product item container having a weight exceeding the predetermined loaded target weight by a predetermined tolerance.

22. The system of claim 19, further comprising, after ending the automatedly picking and placing, flagging a product item container for removal based on the product item container having a weight under the predetermined loaded target weight by a predetermined tolerance.

23. The system of claim 1, wherein the size of the one or more identified product items is relative to other product items in the digital image.

* * * * *